Feb. 9, 1937.　　　M. IRELAND　　　2,070,129
TOASTER CASING
Filed Nov. 9, 1935　　　2 Sheets-Sheet 1
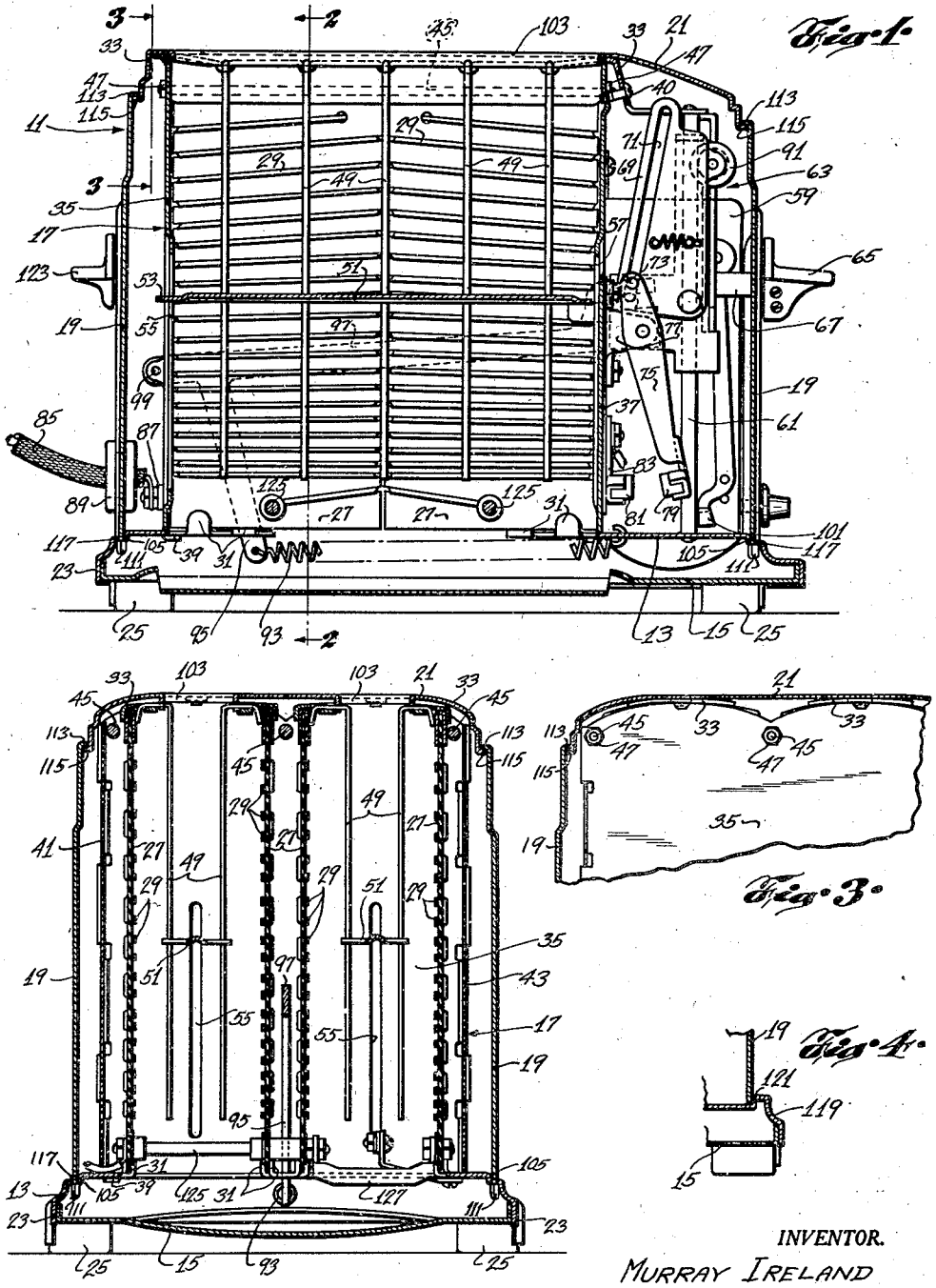
INVENTOR.
MURRAY IRELAND
BY Roy M. Eilers
ATTORNEY.

Feb. 9, 1937.　　　M. IRELAND　　　2,070,129
TOASTER CASING
Filed Nov. 9, 1935　　　2 Sheets-Sheet 2
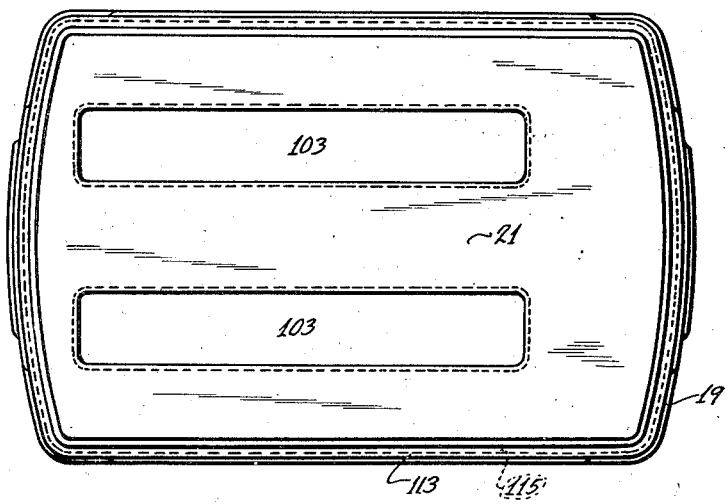
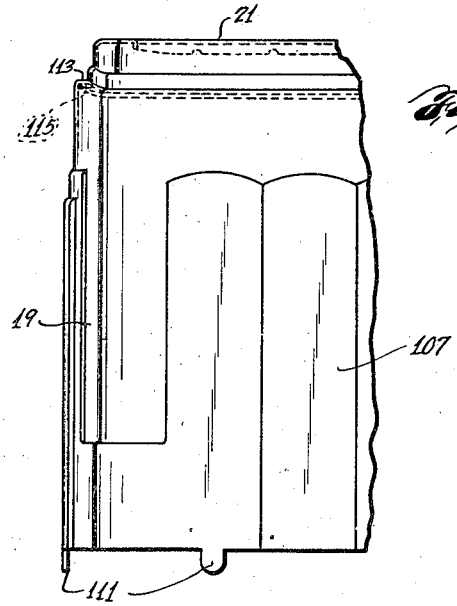
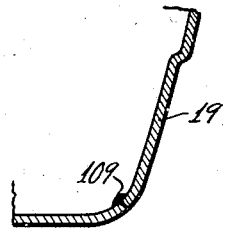
INVENTOR.
MURRAY IRELAND
BY Roy M. Eilers
ATTORNEY.

Patented Feb. 9, 1937

2,070,129

UNITED STATES PATENT OFFICE 2,070,129

TOASTER CASING

Murray Ireland, St. Paul, Minn., assignor to McGraw Electric Company, Chicago, Ill., a corporation of Delaware Application November 9, 1935, Serial No. 49,001

13 Claims. (Cl. 53—5)

My invention relates to electric oven type toasters and particularly to casings for such toasters.

An object of my invention is to provide a relatively simple casing construction for an electric toaster that shall be easily manufactured and assembled and comprise a minimum number of parts.

Another object of my invention is to provide a casing for an oven type toaster comprising essentially two parts interfitting with each other at certain edge portions.

Another object of my invention is to provide a casing having a top cover held in its proper operative position and against a toaster frame structure by a casing extending around the frame structure and between the cover and a base for the toaster frame structure.

Other objects will either be pointed out in the course of the description of several forms of casing structures or will be apparent from the description itself.

In practicing my invention I provide in combination with a toasting chamber structure, a base located beneath the structure, a top cover located above the structure and a casing surrounding the structure interfitting with the base and the top cover to hold the cover in its proper operative position on the toasting chamber structure and to hold the casing on the base.

In the drawings,

Figure 1 is a view, in vertical longitudinal section, through a toaster assembly embodying my invention, Fig. 2 is a view in vertical lateral section therethrough, taken on the line 2—2 of Fig. 1, Fig. 3 is a fragmentary vertical sectional view therethrough, taken on the line 3—3 of Fig. 1, Fig. 4 is a fragmentary vertical sectional view showing a modified form of construction which I may use, Fig. 5 is a top plan view of a casing and top cover in proper relative operative positions, Fig. 6 is a partial view, in side elevation, of the parts shown in Fig. 5, and Fig. 7 is a fragmentary sectional view through one corner of a casing.

My invention, as has already been stated, comprises more particularly a casing structure and I will describe the same as applied to a two slice vertical toaster of a particular construction and method of operation, although it is of course obvious that the parts particularly embodying my invention can be applied equally well to other similar devices and particularly electric cooking appliances.

Referring more particularly to Figs. 1, 2 and 3 of the drawings, I have there illustrated an oven type toaster designated in its entirety by the numeral 11 and comprising a base 13, a bottom cover 15 for the base, a toasting chamber or toaster frame structure designated in its entirety by the numeral 17, a single-piece thin sheet material casing 19, and a top cover 21.

The base 13, as will be seen by reference to Figs. 1 and 2 of the drawings, includes more particularly a flat-top member having a downwardly extending peripheral flange 23 into which the bottom closure member or cover 15 is adapted to fit. This bottom cover 15 may be provided with a plurality of heat-insulating supports 25 in order to slightly raise the bottom cover above a supporting surface.

The toasting chamber structure includes a plurality of vertically extending relatively thin sheets of electric-insulating material 27, here shown as four in number in order to accommodate two slices of bread at the same time, and having secured thereon an electric resistor wire 29, the greater portion of which is on the inner side of the respective sheets of material in order that it may be located adjacent to one side of the slice of bread which is to be toasted thereby. The lower end portions of the respective sheets 27 may be held in their proper operative positions by upstanding tabs 31 which may be punched out of and bent away from the top portion of the base 13, alternate tabs 31 being slightly displaced or out of line with the others, as may be seen by reference to the bottom portions of Fig. 2 of the drawings, so that the bottom edges of the sheets 27 may fit therebetween. The upper ends of the sheets 27 may be held by one or more top plates 33 extending longitudinally of the toaster and here shown as being entirely separate one from the other and resting upon a lateral inner rear plate 35 and a lateral front plate 37, the lower ends of which may be secured to the upper part of base 13 as by bending over ears or tabs 39 as is shown in the lower part of Fig. 1 of the drawings. The front part of a top plate 33 may be secured to the front plate 37 by short machine screws 40. Instead of using two top plates I may combine them into one plate.

The toasting chamber structure mounted on the base 13 includes also longitudinally extending inner side walls 41 and 43 which may be made of relatively thin sheet material, such as aluminum or other suitable metal. The front and rear plates 35 and 37 are held in proper operative and spaced positions by means of a plurality of rods 45 extending therethrough at the upper edge thereof and having nuts 47 screwed thereon on the outside of the plates 35 and 37.

A plurality of depending guide wires 49 are provided having interfitting engagement with the top plates 33 and depending therefrom. These bread slice guide wires interfit also with bread slice supports 51 which extend between the front and rear inner plates 37 and 35 and have portions extending therethrough. Thus a rear end portion 53 of the respective plates 51 extends through a slot 55 in the rear inner end plate 35 and a part thereof extends through a similar slot 57 in the front inner plate 37 to have certain parts secured thereto as will be hereinafter described.

A mechanical timer or spring driven clock is indicated generally by a rectangle designated by the numeral 59 in Fig. 1 of the drawings and may be of the type shown in my Patent No. 1,866,808, assigned by mesne assignments to the same assignee as is the present application. This timing mechanism is effective to release the bread slice supports 51 from their operative positions and also to deenergize the resistors 29 in a manner now to be briefly described mainly for the purpose of describing parts already well known with which the casing more particularly constituting my invention is associated.

A plurality of horizontally spaced vertically extending rods 61 are located in a small mechanism compartment 63, shown more particularly in Fig. 1 of the drawings, having their lower ends secured to the top part of base 13 and their upper ends to a forwardly extending part of the top plates 33. Means for depressing the bread slice supports 51 and for energizing the resistors 29 includes an external operating knob 65 mounted on the front end of a horizontally forwardly extending bar 67 which is operatively secured to the bread slice support 51 hereinbefore described. A plate 69 having an angularly extending slot 71 therein (see Fig. 1) is operatively associated with the bread slice support 51 and the bar 67 and has movable therein the pin 73 secured in the upper end of a contact arm 75 pivotally mounted on a plate 77 secured to the front inner plate 37, the lower end of the arm 75 having mounted therein a contact member 79 which may be of carbon and which may cooperate with a fixed contact member 81 held in a plate 83 insulatedly mounted against the front surface of inner plate 37. Suitable leads or wires, not shown in the drawings, connect the fixed contact member 81 and the contact arm 75 in series circuit relation with the resistor wires 29 and a twin conductor cord 85 is provided extending through the casing 19 at the rear of the toaster and connected to a pair of terminals 87, as is shown more particularly in Fig. 1 of the drawings. The supply circuit conductor 85 may extend through the rear wall of casing 19 through a bushing 89 in a manner well known in the art.

When pressure is applied on the knob 65 to move the hereinbefore described elements downwardly, a plurality of rollers 91 engaging the rods 61 permit of easy and quick downward movement by manually applied pressure against the tension of a spring 93, one end of which is connected to a part of the top portion of base 13 while the other end is connected to the lower end of an arm 95 depending from a longitudinally extending arm 97 which is pivotally mounted as at 99 on the rear plate 35. The bread slice supports 51 and the other vertically movable parts directly operatively associated therewith are held in their lowermost operative positions by a latch member 101 (see Fig. 1) against the tension of spring 93. The downward movement of actuating knob 65 winds up the spring in the timer 59, which timer is effective after a certain length of time to release the bread slice supports from the latch 101, the spring 93 then returning them to the position shown in Figs. 1 and 2 of the drawings, so that slices of bread located thereon may project upwardly through openings 103 in the toaster structure and be removed by an operator.

As has already hereinbefore been set forth, these elements constitute no part of my present invention and have been illustrated and described in order to show the application of my new and improved casing structure to these parts. It will be noted by reference to Figs. 1 and 2 of the drawings that I provide a shouldered flange 105 around substantially the entire peripheral portion of the base 13 and in the embodiment shown in Figs. 1 and 2 the vertically extending shoulder is adapted to be located inside of the lower edge of the casing 19. I prefer to make the casing 19 of a single piece of punched and shaped sheet metal which may be provided with panels 107, as will be seen by reference to Fig. 6 of the drawings, the abutting ends or vertical edges of the single piece of sheet metal meeting at a corner thereof and being welded together as shown by numeral 109 in Fig. 7 of the drawings. While I at present prefer to make this joint at a corner of the casing, which it will be noted from the drawings is substantially rectangular in contour, I do not desire to be limited thereto. I prefer to make the joint at a corner since it provides an easy means for removing any excess material which may be deposited at the joint outside of the casing during the various steps of manufacturing the casing itself. This is a desirable feature since a casing of this kind must be very carefully finished and electroplated in order to provide a pleasing appearance. The panels shown and described are not an essential part of my invention and could be omitted, thus providing a flat surface.

The casing is further provided with a number of spaced depending ears or lugs 111 for a purpose to be hereinafter set forth. The upper end portion of the casing is provided with an inturned flange 113 which extends entirely around the upper edge of the casing 19.

The peripheral edge portion of the top cover 21 is also provided with a shouldered outwardly extending flange 115 which is adapted to fit beneath the inturned flange 113 at the upper edge of the casing.

In assembling the outer casing, the top cover 21 is located in its proper operative position in the upper end of casing 19, substantially in the position shown in Figs. 1 and 2 of the drawings, after which the casing is located in its proper operative position around the toasting chamber structure and on the base, the lower edge of the casing fitting outside of the shouldered peripheral flange 105 provided on the base 13, as will be seen by reference to Figs. 1 and 2 of the drawings. It is of course to be understood that the actuating knob 65 is not mounted on the arm 67 at the time that the casing is mounted on the base as has just been described. The ears 111 are then either twisted or bent over the base 13, suitable openings 117 being provided in the base through which these ears may extend. In so doing the cover member 21 is drawn downwardly against the upper end portions of the toasting chamber structure hereinbefore described and particularly against the top plates 33. It is to be understood that a downward pressure on the casing will be applied thereto so that the lower edge of casing 19 will fit closely against the upper surface of the base 13 in order to present a pleasing appearance.

Referring now to Fig. 4 of the drawings, I have there illustrated a slightly modified form of base 119 in which a vertical flange 121 is located immediately outside of the casing 19 instead of inside thereof as is shown in Figs. 1 and 2 of the drawings, thereby providing a construction covering the lower edge of the casing 19.

A rear knob 123 is secured to the casing in order that the toaster may be carried when and as may be necessary.

Any desired method of connecting the plurality of individual heating elements may be provided and I have shown a plurality of laterally extending electric connecting means 125 and 127 (see Fig. 2 of the drawings) to electrically connect the resistors on the various heating elements, which in this case are connected in parallel circuit relation relatively to each other.

The casing structure embodying my invention and comprising more particularly the single piece casing 19 and the top cover 21 provides a relatively simple outer casing for an oven type of toaster which can be easily manufactured and assembled, which interfit with each other and in which the casing interfits with the base in such manner as to be securely held thereon and to draw or pull downwardly the top cover whereby it is caused to rest upon and engage the upper end of the toaster frame or toasting chamber structure, the depending ears or lugs 111 extending into and through the base 13 providing an easy and effective means for holding the casing against the base and for also holding the top cover in its proper operative position within the casing and on the toasting chamber structure.

Various modifications may be made in the device embodying my invention without departing from the spirit and scope thereof and I desire that all such modifications shall be included under the present claims which are to be limited only by the prior art.

I claim as my invention:

1. A toaster of the oven type comprising a toasting-chamber structure, an outer casing spaced from and surrounding the toasting chamber structure and having an inturned flange at its upper edge, a top cover having a peripheral edge portion received below the inturned flange of the outer casing, a substantially flat-top base below the toasting-chamber structure and the outer casing and having a shouldered flange at its upper face within and near its outer periphery adapted to receive the lower edge of the outer casing and position the same on the base and depending ears on the outer casing adapted to extend through the base and then angularly relatively thereto to draw the top cover against the upper end portion of the toasting-chamber structure.

2. A toaster of the oven type comprising a substantially flat-top base, a toasting-chamber structure located above the base, a top cover having an outwardly-extending peripheral-edge shouldered flange, an outer casing surrounding the toasting-chamber structure and having an inturned flange at its upper edge adapted to fit over the shouldered flange on the top cover and ears integral with the outer casing at its lower edge extending through and cooperating with the base to hold the top cover against the toasting-chamber structure and the casing in proper operative position against the base.

3. A toaster of the oven type comprising a substantially flat-top base having a peripheral vertical flange on its upper face, a toasting-chamber structure supported above the base, a top cover over the toasting-chamber structure and having a peripheral flange at its outer edge, an outer casing surrounding the toasting chamber structure, having its lower edge interfitting with the peripheral vertical flange on the base and having an inturned peripheral flange at its upper edge adapted to fit over the peripheral flange of the top cover and ears integral with the outer casing at its lower edge and extending through the base to hold the outer casing on the base and the top cover against the toasting-chamber structure.

4. A toaster of the oven type comprising a base, a toaster-frame structure above the base, an outer thin-sheet casing on the base surrounding the frame structure and having an inturned flange at its upper edge, a top cover of thin sheet material having a shouldered flange at its outer periphery adapted to fit below the inturned casing flange and lugs on the casing at its bottom edge extending through the base and bent angularly relatively thereto to yieldingly hold the cover against the upper end portions of the frame structure.

5. A toaster of the oven type comprising a base, a toaster frame structure supported above the base, an outer casing on the base surrounding the frame structure and having an inturned lateral flange at its upper edge, a top cover entirely within the casing having a flange at its outer periphery adapted to fit below the inturned lateral flange of the casing to hold the cover upon and against the frame structure and means at the bottom edge of the casing and extending into the base to hold the casing thereon.

6. A toaster of the oven type comprising a base, a toaster frame structure operatively secured to and located above the base, an outer casing resting on the base surrounding the frame structure and having a flange at its upper edge, a top cover having a flange at its outer periphery interfitting with the flange of the casing to be held thereby against the frame structure, and means at the bottom edge of the casing interfitting with the base to hold the casing thereon.

7. A toaster of the oven type comprising a base, a toaster frame structure supported above the base, an outer casing resting on the base and surrounding the frame structure, a top cover having its outer periphery interfitting with the outer casing to be held thereby in its proper operative position above the frame structure and means on the outer casing at its bottom edge to engage with the base and hold the casing thereon.

8. A toaster of the oven type comprising a base, a toaster frame structure above the base, an outer casing resting on the base and surrounding the frame and a top cover having its outer periphery interfitting with the outer casing contained therewithin and held thereby in its proper operative position.

9. A toaster of the oven type comprising a base, a toaster frame structure above the base, an outer casing surrounding the frame structure, a top cover located within the periphery of the casing, cooperating interfitting means on the casing and the base to draw the casing toward the base and hold it relatively thereto and cooperating interfitting means at the upper edge of the casing and at the outer periphery of the cover to hold the cover against the frame structure.

10. A toaster of the oven type comprising a base having an upstanding flange on its upper surface, a toaster frame structure on the base, a single piece casing surrounding the frame, having its lower edge interfitting with said flange on the base and having a laterally inturned flange at its upper edge, a top cover having an outwardly extending flange at its outer periphery adapted to fit below the upper edge flange of the casing and means securing the casing to the base and drawing the cover against the upper end portions of the frame structure.

11. A toaster of the oven type comprising a base, a toaster frame structure on the base, an outer casing on the base surrounding the frame structure and having an inturned flange at its upper edge, a top cover having its outer periphery located below the inturned flange of the casing and means at the lower edge of the casing for securing it against the base and for drawing the top cover against the upper end portion of the frame structure.

12. A toaster of the oven type comprising a base, a toaster frame structure on the base, an outer casing on the base extending around the frame structure, the upper edge of the casing being located below the upper end of the frame structure and having an inturned flange, a cover resting on the upper end of the frame structure and having a depending outer peripheral flange located below the inturned flange of the casing and lugs at the lower edge of the casing extending through the base to hold the casing on the base and the cover against the frame structure.

13. A toaster of the oven type comprising a base, a toaster frame structure on the base, an open top casing on the base extending around the frame structure, a cover over the frame structure and within the contour of the casing and interfitting means on the top edge of the casing and the outer peripheral edge of the cover and coextensive therewith to cause the casing to hold the cover against the upper end portion of the frame structure.

MURRAY IRELAND.